(12) United States Patent
Elliott (10) Patent No.: US 8,423,453 B1
(45) Date of Patent: Apr. 16, 2013

(54) SYSTEMS AND METHODS FOR PROCESSING A TRANSACTION

(75) Inventor: Richard Elliott, Glen Allen, VA (US)

(73) Assignee: Capital One Financial Corporation, McLean, VA (US)

( * ) Notice: Subject to any disclaimer, the term of this patent is extended or adjusted under 35 U.S.C. 154(b) by 438 days.

(21) Appl. No.: 12/574,950

(22) Filed: Oct. 7, 2009

(51) Int. Cl.
*G06Q 40/00* (2012.01)

(52) U.S. Cl.
USPC .............................................. 705/38; 705/35

(58) Field of Classification Search ...................... 705/38
See application file for complete search history.

(56) References Cited

U.S. PATENT DOCUMENTS

| | | | |
|---|---|---|---|
| 5,661,284 A | 8/1997 | Freeman et al. | |
| 6,000,608 A | 12/1999 | Dorf | |
| 6,029,150 A | 2/2000 | Kravitz | |
| 6,032,136 A | 2/2000 | Brake, Jr. et al. | |
| 6,038,552 A * | 3/2000 | Fleischl et al. | 705/44 |
| 6,065,675 A | 5/2000 | Teicher | |
| 6,105,001 A | 8/2000 | Masi et al. | |
| 6,189,787 B1 | 2/2001 | Dorf | |
| 6,202,054 B1 | 3/2001 | Lawlor et al. | |
| 6,295,522 B1 | 9/2001 | Boesch | |
| 6,315,195 B1 | 11/2001 | Ramachandran | |
| 6,332,134 B1 | 12/2001 | Foster | |
| 6,505,772 B1 | 1/2003 | Mollett et al. | |
| 6,598,028 B1 | 7/2003 | Sullivan et al. | |
| 6,609,113 B1 | 8/2003 | O'Leary | |
| 6,702,181 B2 | 3/2004 | Ramachandran | |
| 2001/0047342 A1 | 11/2001 | Cuervo | |
| 2001/0054003 A1 | 12/2001 | Chien et al. | |
| 2002/0029194 A1 | 3/2002 | Lewis et al. | |
| 2002/0052841 A1 | 5/2002 | Guthrie et al. | |
| 2002/0103752 A1 | 8/2002 | Berger et al. | |
| 2003/0033245 A1 | 2/2003 | Kahr | |
| 2003/0097270 A1 | 5/2003 | Musselwhite et al. | |
| 2003/0115135 A1 | 6/2003 | Sarfraz et al. | |
| 2003/0135462 A1 | 7/2003 | Brake, Jr. et al. | |
| 2003/0233333 A1 | 12/2003 | Lee et al. | |
| 2005/0102188 A1 | 5/2005 | Hutchison et al. | |

(Continued)

FOREIGN PATENT DOCUMENTS

| | | |
|---|---|---|
| JP | 2004/102787 | 10/2002 |
| JP | 2002/288570 | 4/2004 |
| WO | 01/52211 | 5/2000 |
| WO | 01/54026 | 7/2001 |

OTHER PUBLICATIONS

Ewoldt, J., Dollars and Sense, Redeeming Qualities, TCF's New Miles Plus Card Takes on U.S. Bank's WorldPerks Visa Card, Star Tribune, Variety p. 1E, Oct. 21, 2004.

Ewoldt, J., Word of Mouth, It's in the Cards: Readers Respond, Star Tribune, Variety, p. 1E, Oct. 30, 2004.

(Continued)

*Primary Examiner* — Kirsten Apple
(74) *Attorney, Agent, or Firm* — Hunton & Williams LLP (57) ABSTRACT

A system and method for processing a transaction by identifying a credit account and a demand deposit account, receiving transaction data associated with a transaction initiated by an account holder with a merchant using the credit account, determining whether the transaction amount exceeds the available credit amount, requesting via a network a transfer of the transaction amount from the demand deposit account, and transferring at least a portion of the transaction amount to pay the merchant. The transfer may be a first type of transfer or a second type of transfer depending on whether the transaction amount exceeds the available credit amount.

26 Claims, 7 Drawing Sheets

U.S. PATENT DOCUMENTS

| | | | |
|---|---|---|---|
| 2005/0192897 | A1 | 9/2005 | Rogers et al. |
| 2005/0234817 | A1 | 10/2005 | VanFleet et al. |
| 2006/0004655 | A1 | 1/2006 | Alexander et al. |
| 2006/0026073 | A1 | 2/2006 | Kenny, Jr. et al. |
| 2006/0036540 | A1 | 2/2006 | Lawrence et al. |
| 2006/0131392 | A1* | 6/2006 | Cooper .................. 235/380 |
| 2006/0143119 | A1 | 6/2006 | Krueger et al. |
| 2007/0295805 | A1 | 12/2007 | Ramachandran |
| 2010/0030687 | A1* | 2/2010 | Panthaki et al. ............ 705/43 |
| 2010/0114763 | A1* | 5/2010 | Rosenberger ............... 705/40 |

OTHER PUBLICATIONS

Kuykendall, L. and Lindenmayer, I., Responses to Visa's Interchange Fee Revamp Vary; Visa U.S.A. Inc., American Banker, No. 213, vol. 169, p. 7, ISSN: 0002-7561.

Lee, W.A., In a New Payments Era, Cooper Plays Hardball; William Cooper, American Banker, No. 230, col. 169, pp. 12A, ISSN: 0002-7561, Dec. 2, 2004.

Lieber, R., Reward Plans for Debit Cards Get Revamped, Wall Street Journal, Jul. 3, 2003, pp. D1 and D2.

Wade, W. Why TCF is Staying in Payments Debate, TCF Financial Corp. Joins Nasha-Electronics Payment Association, American Banker, No. 157, vol. 169, p. 1, ISSN: 0002-7561, Aug. 16, 2004.

Wade, W., TCF National of Minnesota Joins Nacha, Brief Article, American Banker, No. 155, vol. 169, p. 12, ISSN: 002-7561, Aug. 12, 2004.

Wayzata, Minn, TCF Introduces New High-Yield Checking Account With Free Air Miles Card, PR Newswire, Financial news, Aug. 12, 2004.

Wayzata, Minn, TCF Reports Third Quarter Earnings and EPS of $.45, Third Quarter Highlights, PR Newswire US, Oct. 14, 2004.

With ACH Transactions Growing, TCF Bank Joins Nacha, Cardline, vol. 4, No. 33, p. 1, Aug. 13, 2004.

* cited by examiner

SYSTEMS AND METHODS FOR PROCESSING A TRANSACTION

FIELD OF THE INVENTION

The present inventions relate to systems and methods for processing transactions.

BACKGROUND OF THE INVENTION

An account provider may provide an account that is funded by a "linked" source account to cover transactions conducted by the account holder. Transfers from the source account may take a period of days, however, during which time the account provider may incur the risk associated with extending the account holder credit for the amount of each transaction. Account providers may lack a way to reduce and/or manage this credit risk.

These and other drawbacks exist with current systems.

SUMMARY OF THE INVENTION

Various exemplary embodiments provide for processing a transaction.

Credit cards, debit cards, and other types of cards are commonly used today by consumers to fund transactions at or with merchants. When credit cards and debit cards are used by consumers, fees, such as interchange fees, are routinely imposed for the transaction. Account providers and other entities involved in processing transactions may receive at least a portion of interchange fees charged to merchants by card associations and/or merchant processors, for example. Interchange rates for credit card transactions are commonly higher than interchange rates for debit cards.

Also commonly used are automated clearing house (ACH) transactions. ACH is a form of electronic payment. Specifically, ACH is an electronic fund transfer through an ACH network including the Federal Reserve Bank from one account to another account, such as to a checking or savings account. ACH is typically used to process payments for settlement within a period of time, such as a few business days. ACH transactions are settled in a manner similar to the way checks are settled. The clearinghouse takes all ACH files received daily from its member banks, sorts them by the originating bank (the bank where the check was cashed or deposited) and the paying bank (the bank against which the check was drawn), totals the accounts, and credits or debits appropriate accounts accordingly.

In one illustrative example of a system for processing a transaction, an account holder may have an account, such as a credit account, that is funded by another "linked" account, such as a demand deposit account. When the account holder initiates a transaction using the credit account, a computer system associated with the account provider may request an ACH transfer of the transaction amount from the demand deposit account to the credit account to fund the transaction. Because the transaction was submitted for authorization and settlement as a credit transaction, the account provider may take advantage of higher interchange rates and may pass along that revenue to account holders, for example, in the form of rewards, which often are not offered for debit cards.

Different types of transfers may take different amounts of time to complete, however, during which time the account provider may incur the risk associated with extending the account holder credit for the amount of the transaction. For example, an ACH transfer may take up to three days from when the transfer is first requested, meaning that the account holder's credit account may not be sufficiently funded at the time the ACH transfer request is made. To reduce and/or manage this risk, the account provider computer system may set an available credit amount, such as $200, for the credit account, and when a new transaction occurs it may determine whether the amount of the transaction exceeds the available credit limit. If not, the account provider may request a standard ACH transfer via an ACH network. The available credit limit may then be reduced by the transaction amount while the transfer is pending, and increased by the transaction amount when the transfer is later received. But if the transaction amount exceeds the available credit limit, the account provider computer system may request and receive a real-time debit request via a debit network so that the credit account is funded for the transaction in less time. Other types of transfers may be requested via other types of networks as well, depending on the circumstances. For example, some types of transfers require a signature or personal identification number (PIN). The account provider computer system may also transfer at least a portion of the transaction amount to pay the merchant.

In another illustrative example, a computer system associated with a source account provider may receive a transfer request as described above and transfer the transaction amount according to the type of transfer requested. For example, the source account provider computer system may make an ACH transfer via an ACH network if that is what was requested. Or, the source account provider may make a real-time debit transfer via a debit network if that is what was requested instead.

Other embodiments are also within the scope of the invention.

BRIEF DESCRIPTION OF THE DRAWINGS

The present invention, together with further objects and advantages, may best be understood by reference to the following description taken in conjunction with the accompanying drawings, in the several Figures of which like reference numerals identify like elements, and in which:

FIG. 5 depicts an exemplary balance sheet for a credit account used for multiple transactions over time according to various embodiments of the disclosure;

DETAILED DESCRIPTION OF EXEMPLARY EMBODIMENT(S)

The following description is intended to convey a thorough understanding of the embodiments described by providing a number of specific embodiments and details involving systems and methods for processing a transaction. It should be appreciated, however, that the present disclosure is not limited to these specific embodiments and details, which are exemplary only. It is further understood that one possessing ordinary skill in the art, in light of known systems and methods, would appreciate the use of the invention for its intended purposes and benefits in any number of alternative embodiments, depending on specific design and other needs.

Figure 1:
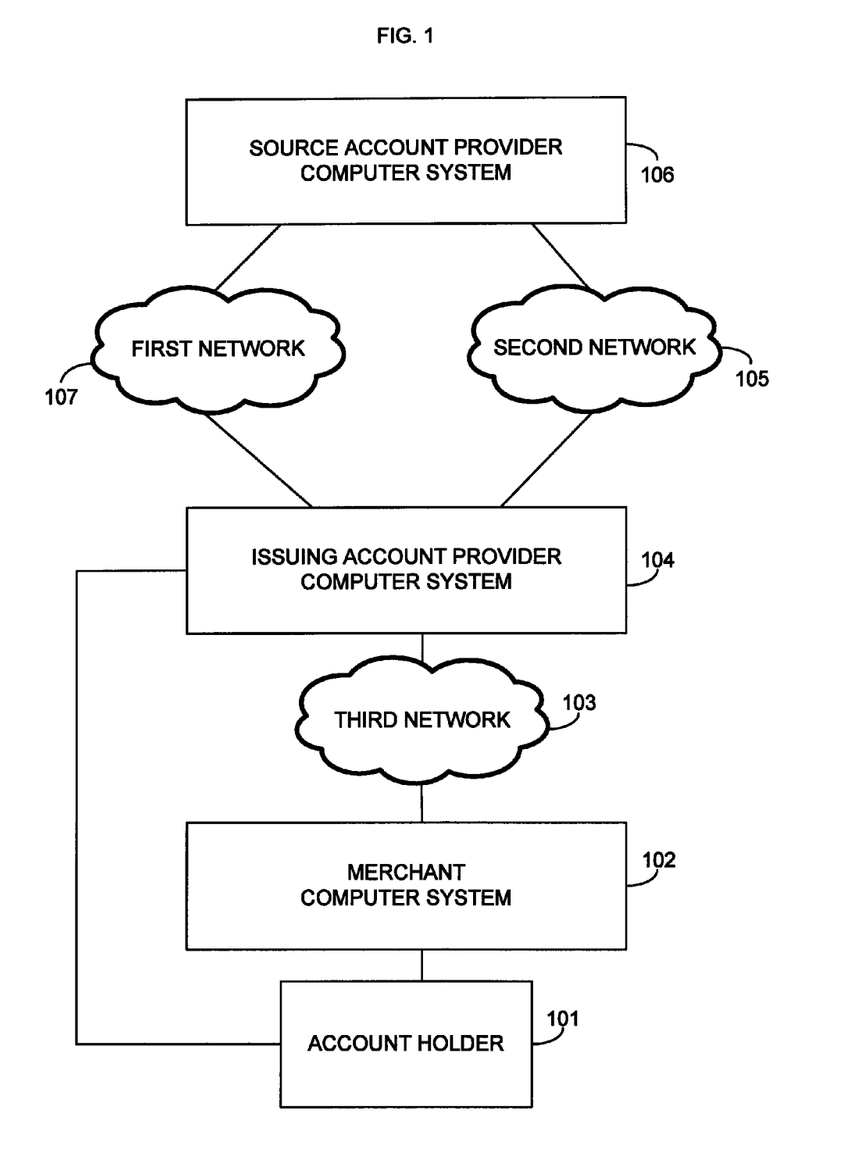
FIG. 1 depicts an exemplary system for processing a transaction according to various embodiments of the disclosure.
Figure 2:
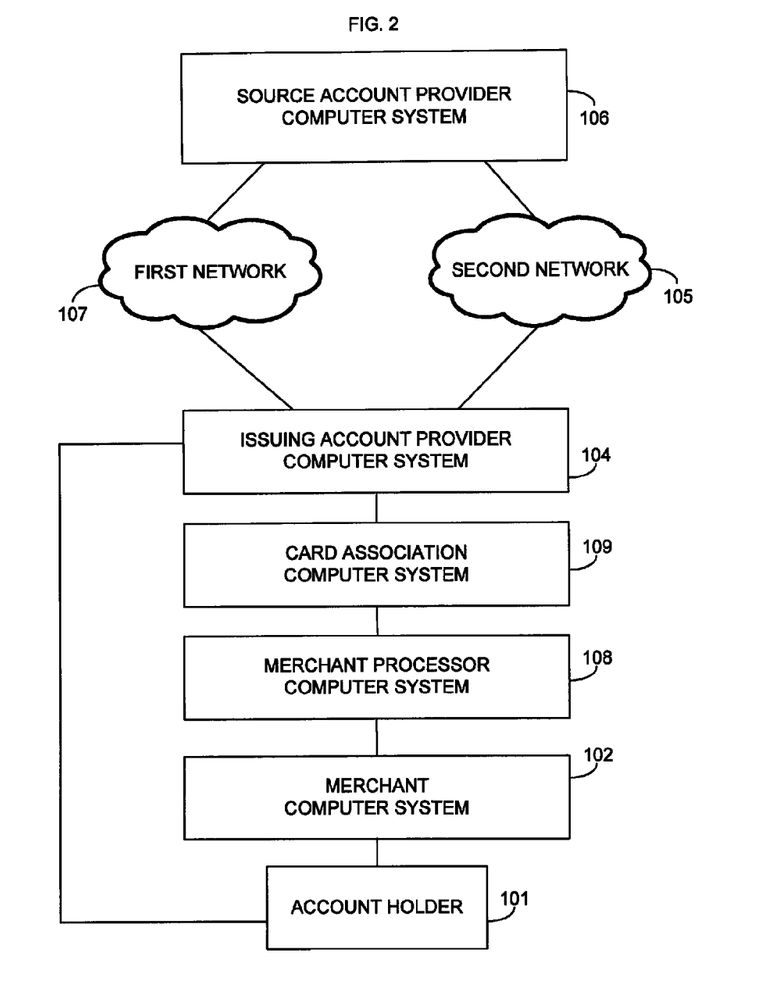
FIG. 2 depicts an exemplary system for processing a transaction using a merchant processor and a card association according to various embodiments of the disclosure.

FIGS. 1 through 4 depict exemplary embodiments of systems for processing a transaction according to various embodiments of the disclosure. The systems may involve various network-enabled computer systems to process a transaction, including, as depicted in FIGS. 1 and 2, for example, a merchant computer system 102, a merchant processor computer system 108, a card association computer system 109, an issuing account provider computer system 104, and a source account provider computer system 106. As referred to herein, a network-enabled computer system may include, but is not limited to: e.g., any computer device, or communications device including, e.g., a server, a network appliance, a personal computer (PC), a workstation, a mobile device, a phone, a handheld PC, a personal digital assistant (PDA), an automated teller machine (ATM), a thin client, a fat client, an Internet browser, or other device. The network-enabled computer systems may execute one or more software applications to, for example, receive data as input from an entity accessing the network-enabled computer system, process received data, transmit data over a network, and receive data over a network. The one or more network-enabled computer systems may also include one or more software applications to enable the processing of a transaction, as described herein.

Figure 3:
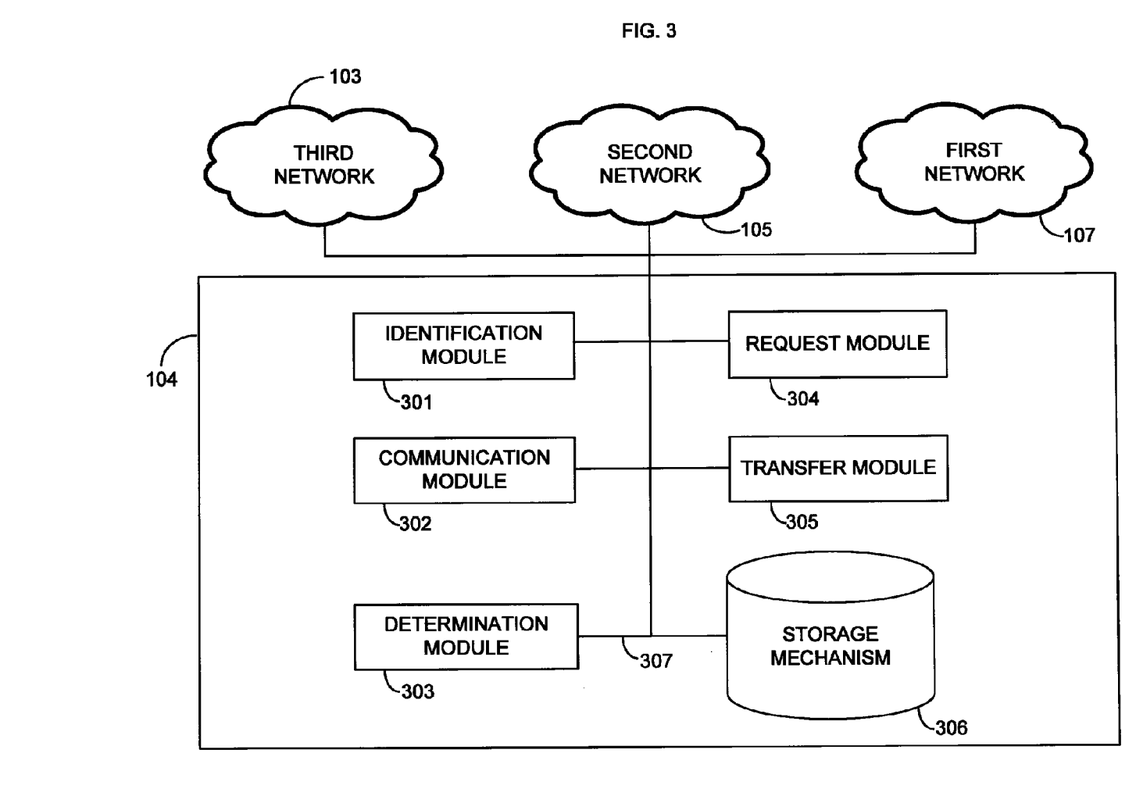
FIG. 3 depicts an exemplary issuing account provider computer system according to various embodiments of the disclosure.
Figure 4:
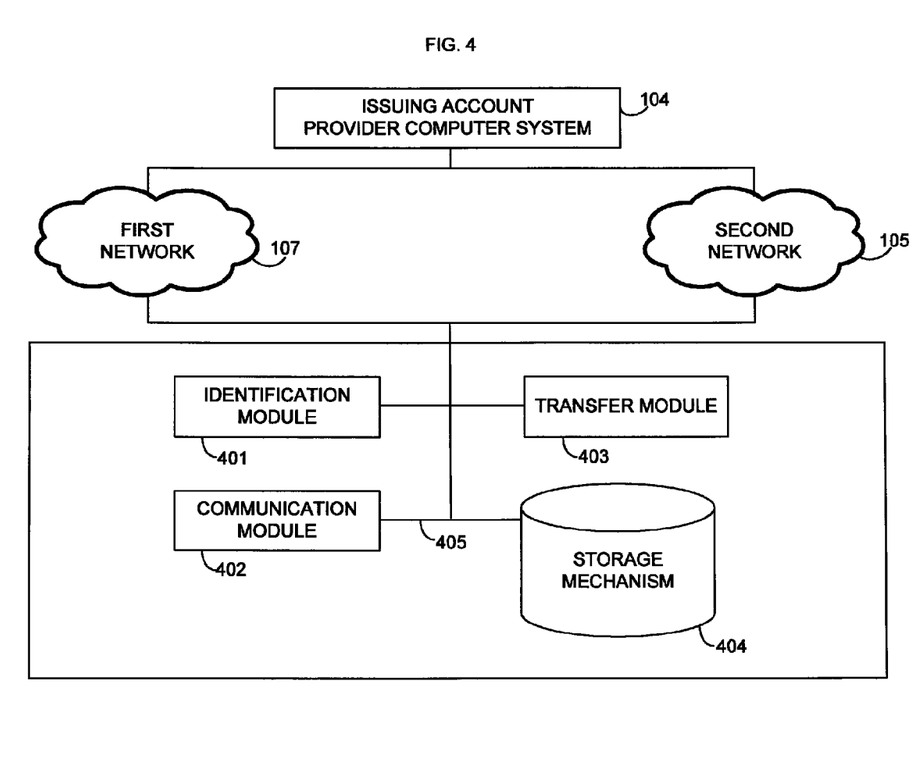
FIG. 4 depicts an exemplary source account provider computer system according to various embodiments of the disclosure.

The components depicted in FIGS. 1 through 4 may store information in various electronic storage media, such as, for example, a storage mechanism 306 depicted in FIG. 3 and a storage mechanism 404 depicted in FIG. 4. It is well-known in the art that electronic information, files, and documents may be stored in various ways, including, for example, a flat file, indexed file, hierarchical database, relational database, such as a database created and maintained with software from, for example, Oracle® Corporation, Microsoft® Excel file, Microsoft® Access file, or any other storage mechanism.

The components depicted in FIGS. 1 through 4 may be coupled via one or more networks, such as, for example, a first network 107, a second network 105, and a third network 103, which may the same or different from each other. As referred to herein, a network may include, but is not limited to: e.g., a wide area network (WAN), a local area network (LAN), a global network such as the Internet, a telephone network such as a public switch telephone network, a wireless communication network, a cellular network, an intranet, or the like, or any combination thereof. In various exemplary embodiments, a network may include one, or any number of the exemplary types of networks mentioned above, operating as a stand alone network or in cooperation with each other. Use of the term network herein is not intended to limit the network to a single network. The components depicted in FIGS. 1 through 4 may communicate by electronic transmission through the one or more networks mentioned above, by physical delivery, or by any other communication mechanism. Communication between two components depicted in FIGS. 1 through 4 may also include communication with any other entities between the two components.

In various exemplary embodiments, account holder 101 may be any individual or entity that desires to conduct a financial transaction using one or more accounts held at one or more account providers. Alternatively, account holder 101 may be a computer system associated with or operated by such an individual or entity. As used herein, the term account may include any place, location, object, entity, or other mechanism for holding money or performing monetary transactions in any form, including, without limitation, electronic form. An account may be, for example, a prepaid card account, stored value card account, debit card account, check card account, payroll card account, gift card account, prepaid credit card account, charge card account, checking account, rewards account, line of credit account, credit account, mobile device account, or mobile commerce account. An account provider may be, for example, a bank, other type of financial institution, or any other entity that offers accounts to customers. An account may or may not have an associated card, such as, for example, a credit card for a credit account.

Account holder 101 may conduct financial transactions with one or more merchants using an account. For example, account holder 101 may desire to purchase goods or services from a merchant associated with merchant computer system 102. To do so, account holder 101 may use a unique account identifier associated with his or her account, which may be any sequence of letters, numbers, characters, or symbols of any length associated with a payment mechanism, including, without limitation, a credit card, debit card, smart card, charge card, or any other mechanism for making payment. The payment mechanism may be issued to account holder 101 by the corresponding account provider, such as an issuing account provider associated with issuing account provider computer system 104. For example, account holder 101 may be issued a credit card that allows account holder 101 to make purchases on credit up to a specified dollar limit and repay the account provider for those purchases over time by making monthly payments. The account provider may pay for the purchases of account holder 101 at the time of purchase on behalf of account holder 101 and charge account holder 101 interest for using its credit services. Also, account holder 101 may use a charge card wherein the balance of the account holder's card may be paid off monthly or a debit card wherein amounts for the account holder's purchases may be electronically debited from a checking or other account held by account holder 101 with the account provider.

To make a purchase, account holder 101 may, for example and without limitation, swipe his or her transaction card in person at the location of a merchant using a register, card payment terminal, ATM, or point of sale (POS) system, which may read the account identifier from the magnetic stripe on the card. Also, the account identifier may be provided via a bar code on the card. Also, account holder 101 may provide a merchant with the account identifier over the telephone using a Voice Response Unit (VRU). Also, the account identifier may be provided via radio-frequency identification (RFID), near field communication (NFC), or other automatic identification mechanisms. Also, an account identifier may be associated with biometric information provided by account holder 101 (e.g., fingerprint, iris scan, signature, voice). Various mechanisms for accepting an account identifier as payment will be recognized by those skilled in the art, including, for example, transaction processing equipment and software provided by, for example, VeriFone, Inc. of San Jose, Calif.

Account holder 101 may also initiate a purchase transaction electronically using a computer system. Such a computer system may be, for example and without limitation, a personal computer or wireless/mobile device running a web browser program, which may communicate with merchant computer system 102 by electronic transmission over a network, such as the Internet. A web browser program on the account holder's computer system may connect to a server of merchant computer system 102 and request the Uniform Resource Locator (URL) of a web page from the server. The server may receive the request, process the request, retrieve or create the requested web page (e.g., a web page showing the item to be purchased and a price), and transmit the requested web page to the account holder's computer system. The web browser program may receive the web page and render it on a monitor or screen. Account holder 101 may then interact with the web page by, for example, clicking on buttons or activating links associated with the web page or entering information with a keyboard. The web browser program may interpret this interaction and send information back to the server to perform various actions as instructed by account holder 101. For example, account holder 101 may enter his or her account identifier and/or other information associated with the desired purchase on the web page and click a button to initiate the purchase. Examples of commercial web browser programs suitable for this purpose are Internet Explorer available from Microsoft® Corporation, Safari® available from Apple®, Inc., and Firefox® available from Mozilla Corporation. The web pages described above may be, for example, HTML (Hypertext Markup Language), XML (Extensible Markup Language), ASP (Active Server Page), Java, Javascript, XHTML (Extensible HyperText Markup Language), or Ajax (Asynchronous JavaScript and XML) files, or any other file format that allows web pages or portions of web pages to be rendered in a web browser. It will be recognized by those skilled in the art that various tools are readily available to create and render web pages.

Various other mechanisms for conducting financial transactions will be recognized by those skilled in the art. Items may be purchased by charging an amount to a mobile device, such as a cellular phone, PDA, or smart phone, using various known mechanisms for mobile commerce (otherwise known as "m-commerce"). For example, account holder 101 may use a software application on a mobile device to charge from the mobile device's account or pre-loaded REED chip. Also, various alternative payment services may be utilized, such as, for example, PayPal, PayPal Mobile, Obopay, and Google Checkout. These services may be accessed from the account holder's computer system and allow account holder 101 to pay for a transaction or transfer money in various ways without using his or her sensitive financial information, such as credit card numbers.

It will also be understood that although purchase transactions are described herein, any type of financial transaction may be performed, such as, for example, a purchase, charge, cash advance, cash withdrawal, loan, payment, bill payment, check, debit, credit, deposit, or direct deposit. It will further be recognized that the systems for processing a transaction, as described in further detail below, may be provided in conjunction with any mechanism described above.

Various exemplary embodiments may provide a mechanism for processing a transaction. As described in reference to FIG. 1, account holder 101 may begin by opening an account with the issuing account provider associated with issuing account provider computer system 104. For example, account holder 101 may open a credit account with a bank and receive a credit card that can be used to purchase goods and services from merchants. Account holder 101 may also open (or already have) another account with a different account provider (or the same account provider), such as a bank. For example, account holder 101 may have a demand deposit account (e.g., checking account, savings account, money market account) at the source account provider associated with source account provider computer system 106. Account holder 101 may also have a corresponding debit card for that account.

In various exemplary embodiments, the credit account may be "linked" to the demand deposit account such that transactions performed with the credit account are funded by the demand deposit account, and a transaction card provided to the account holder for conducting transactions is associated with both "linked" accounts. One advantage of doing so, as described herein, is that the issuing account provider may collect fees for credit-type transactions and either keep those fees as revenue or pass them along to customers (e.g., in the form of rewards). Also, it will be understood that although a credit account is described herein in connection with the issuing account provider, and a demand deposit account is described herein in connection with the source account provider, any type of account may be held at either account provider and used according to the steps described herein.

Account holder 101 may open the credit account and demand deposit account in any way, such as accessing a website over the Internet, as described herein, or by visiting a branch office of the issuing account provider and/or source account provider, for example. Issuing account provider computer system 104 and source account provider computer system 106 may also communicate with each other to establish the accounts. In various exemplary embodiments, issuing account provider computer system 104 may receive from account holder 101 and/or sore account information (e.g., account numbers) for the credit account held at the issuing account provider and the demand deposit account held at the source account provider, and issue a transaction card, associated with both accounts, to account holder 101 to make transactions. As described herein, the two accounts may be "linked" together such that when account holder 101 initiates a transaction using the credit account, the credit account is funded by the demand deposit account to cover the amount of the transaction. For example, issuing account provider computer system 104 may store data reflecting the link between the accounts (e.g., an entry in a database).

In various exemplary embodiments, the credit account held at the issuing account provider may be associated with an available credit amount, which may change as purchases are initiated by account holder 101 and funding transfers are received from the demand deposit account. For example, when the credit account is first opened, the issuing account provider may establish the credit account with a $200 credit limit. The credit limit for the credit account may be set based on any factors, review, analysis, or research performed by any component depicted in FIGS. 1 through 4, or by any other component, entity, or system. For example, issuing account provider computer system 104 may set the credit limit based on the account holder's credit report, credit report score, past account activity, yearly income, debt, and/or personal information. The credit limit may also be increased or decreased at any time and for any reason. For example, issuing account provider computer system 104 may increase the credit limit when account holder 101 opens another account with the issuing account provider or when account holder 101 exhibits good behavior with the credit account. Issuing account provider computer system 104 may also decrease the credit limit if account holder 101 abuses his or her credit. The credit limit may also be zero in certain circumstances, such as when account holder 101 exhibits particular bad behavior or demonstrates a particularly high credit risk.

As depicted in FIG. 1, account holder 101 may initiate a transaction with a merchant (e.g., a book store, electronics store, online retailer) associated with merchant computer system 102, and merchant computer system 102 may provide transaction data to issuing account provider computer system 104 over third network 103. For example, merchant computer system 102 may provide the transaction amount, an account identifier (e.g., account number) for the credit account indicating that account holder 101 used his or her transaction card associated with the "linked" accounts, and/or other information associated with the attempted transaction. Third network 103 may be any proprietary network and/or any network for authorizing and/or settling financial transactions. For example, as depicted in FIG. 2, third network 103 may comprise merchant processor computer system 108 and card association computer system 109.

In the authorization phase, for example, merchant computer system 102 may provide an authorization request to merchant processor computer system 108 electronically over one or more networks. Merchant processor computer system 108 may have a predefined relationship, agreement, or arrangement with the merchant associated with merchant computer system 102 to authorize and settle card transactions on behalf of the merchant, and may process transactions for a plurality of merchants and a plurality of account holders. For example, TSYS Acquiring Solutions, LLC (TSYS), which those skilled in the art will recognize as an entity that authorizes and settles card transactions, may operate merchant processor computer system 108. Merchant processor computer system 108 may then provide the authorization request, or any other authorization data, to card association computer system 109, which may administer cards and act as a gateway between the merchant and the issuing account provider for processing card transactions. Exemplary card associations may include, without limitation, Visa® and MasterCard®. Card association computer system 109 may verify that the desired transaction may be completed and provide the authorization request, or any other authorization data, to issuing account provider computer system 104.

Issuing account provider computer system 104 may create an authorization message, which may, for example, approve or deny the desired transaction, and route the authorization message through card association computer system 109 and merchant processor computer system 108 to merchant computer system 102. If the transaction was denied, the merchant may deny the desired transaction and, for example, refuse to provide account holder 101 with his or her desired goods or services. If the transaction was approved, the merchant may complete the transaction by, for example, receiving the account holder's written signature on a receipt, providing the desired goods or services to account holder 101, and/or storing information associated with the transaction for later settlement.

During the settlement phase, for example, the merchant associated with merchant computer system 102 may receive payment for one or more card transactions, such as purchases of goods and services that the merchant provided to customers. In various exemplary embodiments, merchant computer system 102 may accumulate transactions until a predetermined threshold has been reached, such as, for example, a predetermined total amount or predetermined period of time (e.g., at the end of each business day), before proceeding with settlement. Merchant computer system 102 may provide a batch file representing all of the accumulated transactions to be settled at that time to merchant processor computer system 108, which may create and send one or more batch files each containing transactions associated with respective card association computer system 109. Card association computer system 109 may in turn use the batch file to create and send one or more batch files each containing transactions associated with respective issuing account provider computer system 104. Issuing account provider computer system 104 may respond by routing funds for the transactions contained in a respective batch file to merchant computer system 102 (e.g., depositing funds into an account on behalf of the merchant) through card association computer system 109 and merchant processor computer system 108. In that way, issuing account provider computer system 104 may transfer at least a portion of a transaction amount to pay a merchant.

In various exemplary embodiments, any of the components described in reference to FIGS. 1 and 2, such as, for example, merchant processor computer system 108, card association computer system 109, and/or issuing account provider computer system 104, may charge various entities a fee (e.g., interchange fees) for using their services. For example, issuing account provider computer system 104 may charge the merchant 2% for each transaction, card association computer system 109 may charge the merchant 1% for each transaction, and merchant processor computer system 108 may charge the merchant 1% for each transaction, and reduce the amount paid to the merchant accordingly. Or, card association computer system 109 may charge the merchant 4% for each transaction, and transfer 2% to issuing account provider computer system 104 and 1% to merchant processor computer system 108. As just one example, if account holder 101 purchased a product for $100, the merchant may receive $96 in its account, the issuing account provider may receive $2, the card association may receive $1, and the merchant processor may receive $1. Also, it should be recognized that although only one merchant processor computer system 108 and one card association computer system 109 are shown in FIG. 2, multiple components and/or entities may be used to process a transaction, as described herein.

Once issuing account provider computer system 104 receives transaction data for the account holder's desired transaction, it may attempt to fund the transaction by requesting and receiving funds from the account holder's demand deposit account into the account holder's credit account. In various exemplary embodiments, issuing account provider computer system 104 may first determine whether the transaction amount exceeds the available credit amount, and request different types of transfers (e.g., over different networks) to fund the transaction depending on whether the transaction amount exceeds the available credit amount. For example, the transaction amount may be $129, the available credit amount may be $200, and issuing account provider computer system 104 may therefore determine that the transaction amount does not exceed the available credit amount. In those circumstances, because there is "credit" available, issuing account provider computer system 104 may request a first type of transfer that takes a certain period of time (e.g., a few days) to complete. For example, it will be understood by those of ordinary skill in the art that Automated Clearing House (ACH) transfers typically take up to three days to complete from the time of the initial request. For example, if a bank makes an ACH transfer request on a Monday, it may not actually be paid until the end of the day on Wednesday. As depicted in FIG. 1, this type of transfer may be requested via first network 107, such as an ACH network. Also, the request may be made at any time and in any manner (e.g., batch ACH transfer requests at the end of the day). Also, it will be understood that any other type of limit, threshold, or trigger may be determined. For example, rather than determining whether a transaction exceeds an available credit amount, issuing account provider computer system 104 may determine whether account holder 101 exceeded a cap on his or her purchase transactions (e.g., $1000 per week, 10 transactions per day) and request different types of transfers depending on that determination. Or, issuing account provider computer system 104 may determine whether account holder 101 is a certain type of customer (e.g., platinum customer, gold customer) and request different types of transfers depending on that determination, for example.

In various exemplary embodiments, when a first type of transfer is requested, the available credit amount may be adjusted to reflect the "credit" that is floated to account holder 101 over the period of time that the request is pending. For example, account holder 101 may establish a credit account and a "linked" demand deposit account. The available credit amount when the credit account is first established may be the starting credit limit of $200. Then, when account holder 101 subsequently makes a purchase, issuing account provider computer system 106 may reduce the available credit amount by the amount of the transaction. For example, account holder 101 may attempt to purchase a book for $14.35 from the merchant associated with merchant computer system 102. The available credit amount may be reduced by the transaction amount ($14.35), a new, reduced available credit amount ($185.65) may be associated with the credit account, and an ACH transfer of $14.35 may be requested from the demand deposit account to fund the transaction. Then, when the ACH transfer of $14.35 is received (e.g., three days later), the available credit amount may be correspondingly increased by $14.35, reflecting that account holder 101 again has the $14.35 available as "credit" to make transactions. The issuing account provider may thereby underwrite account holder 101 up to his or her credit limit (e.g., $200).

If, however, issuing account provider computer system 104 determines that the transaction amount exceeds the available credit amount, it may request a second type of transfer to fund the transaction from the demand deposit account at source account provider computer system 106. The second type of transfer may be different from the first type of transfer because account holder 101 does not have sufficient "credit" available to make the purchase (e.g., the risk of extending "credit" to account holder 101 for that amount is high). For example, the available credit amount at the time of a transaction may only be $5, but account holder 101 attempts to purchase an item that costs $129. Issuing account provider computer system 104 may therefore determine that the transaction amount exceeds the available credit amount, and request a second type of transfer that can be completed in a shorter time period (e.g., shorter than the three days it takes an ACH transfer request).

In just one example, the second type of transfer may be a real-time debit transfer. This type of transfer may be requested via second network 105, such as a debit network like Pulse, NYCE, STAR, Interbank, Maestro, and/or Cirrus. It will be understood by those of ordinary skill in the art that transactions over various networks may require the entry of a signature or an account holder's personal identification number (PIN) to complete the transaction, whereas others do not. For example, transactions with verified accounts and transactions using a wireless device with security measures may not require a PIN. Either a PIN or a PIN-less request may be made. For example, issuing account provider computer system 104 may make a real-time PIN or PIN-less debit transfer request by default (e.g., because the cost to use the debit network is less), but switch to a real-time signature debit transfer request (which has a higher cost) when necessary. A signature, PIN, or any other information may be included in the transaction data that is received by issuing account provider computer system 104, or it may be received from account holder 101 or source account provider computer system 106, for example.

Also, it will be understood that the first type of transfer and second type of transfer described herein may take any period of time to complete (e.g., not just the three days for an ACH transfer and real-time for a real-time debit transfer as described herein). Also, the determination, transfer request, and transfer to pay the merchant described herein may be performed at any time, including before, during, or after the authorization and settlement steps also described herein. Also, if the requested transfer is denied by source account provider computer system 106 for any reason, issuing account provider computer system 104 may take any action to ensure funding of the credit account for the transaction (e.g., withdrawing funds from another account held by the account holder, notifying or providing a bill to the account holder, charging the account holder interest). Also, issuing account provider computer system 104 may provide any type of alert to account holder 101 regarding his or her accounts for any reason. For example, issuing account provider computer system 104 may provide an e-mail or text message to account holder 101 whenever he or she is approaching the available credit limit, or whenever a transfer request from the account holder's demand deposit account has been denied. Issuing account provider computer system 104 may also provide balance information, status updates, or other information about account holder 101 and his or her accounts at any time and for any reason.

Issuing account provider computer system 104 may thereby request different types of transfer from source account provider computer system 106 via different networks (e.g., first network 107, second network 105) depending on whether the transaction amount exceeds the available credit amount. However, more than two types of transfers, and more than one source account provider computer system 106, may also be used. For example, issuing account provider computer system 104 may request a first type of transfer if the transaction amount is $0.01 to $10, a second type of transfer if the transaction amount is $10.01 to $100, a third type of transfer if the transaction amount is $100.01 to $1000, and a fourth type of transfer if the transaction amount is $1000.01 to $10,000. Each type of transfer may be different, each request may comprise different information, and each type of transfer may be requested and received at a different time. Also, each type of transfer may be requested from a different source account provider computer system (not shown). For example, a transfer from a first demand deposit account at one source account provider may be requested if the transaction is early in the month, but a transfer from a second demand deposit account at a different source account provider may be requested if the transaction takes place later in the month. Issuing account provider computer system 104 may allow account holder 101 to select any of the options described herein (e.g., using a web page).

In various exemplary embodiments, the different types of transfers may be designed to reduce the issuing account provider's credit risk. Because ACH transfers typically take up to three days from when the transfer is first requested, an account holder's credit account may not be sufficiently funded at the time an ACH transfer request is made. Thus, there may be a level of credit risk associated with requesting funds for a transaction from a demand deposit account and then waiting to receive payment three days later. For example, account holder 101 may purchase a $5000 item, but have no funds available in his or her demand deposit account at the time of the purchase. Source account provider computer system 106 may therefore deny the requested transfer, and the issuing account provider associated with issuing account provider computer system 104 may bear the risk of account holder 101 never paying the $5000. But if an available credit amount is used, transactions that would exceed the amount may result in funds being pulled from the account holder's demand deposit account in real-time, such that issuing account provider computer system 104 avoids the risk of losses being more than the available credit amount at any one time. Establishing an available credit amount that changes as ACH transfers are requested and received, and making real-time debit transfer requests whenever the available credit amount is exceeded, may therefore help alleviate this credit risk somewhat, as described herein and in reference to FIG. 5.

The requested transfer of the transaction amount (or any other amount) may be received from source account provider computer system 106 at any time and in any way. Issuing account provider computer system 104 may also transfer at least a portion of the transaction amount to pay the merchant, as described herein. This may be accomplished at any time and in any way as well (e.g., an electronic funds transfer to the merchant's bank account).

FIG. 5 depicts an exemplary balance sheet 500 for a credit account used for multiple transactions over time according to various embodiments of the disclosure. Rows 511 reflect transactions on Day 1 (e.g., three purchases of $14.35, $40.00, and $30.00), rows 512 reflect transactions on Day 2, rows 513 reflect transactions on Day 3, and rows 514 reflect transactions on Day 4. Column 501 depicts the amount of each transaction, and column 503 depicts the available credit amount after each transaction. Column 502 depicts real-time debit transfer requests that are made and received whenever a transaction amount exceeds the available credit amount. For example, on Day 3, the account holder may have attempted to make a purchase of $129.00, but the available credit amount at the time was only $16.78. Issuing account provider computer system 104 may therefore have requested a real-time debit transfer of $129.00 rather than an ACH transfer. Also, on Day 4, the account holder may have attempted to purchase another item for $38.55, but because the available credit amount at the time was only $34.36, issuing account provider computer system 104 may have requested a real-time debit transfer of $38.55. As shown in column 503, the available credit amount may not change whenever a real-time debit transfer is requested. If an ACH transfer is requested, however, as depicted in column 504, or if an ACH transfer is received, as depicted in column 505, the available credit amount may be adjusted. For example, on Day 1, ACH transfers of $14.35, $40.00, and $30.00 may be requested in one batch request of $84.35 at the end of the day, and the available credit amount may be reduced from $200.00 to $115.65. The $84.35 may then be received at the end of Day 3, resulting in the available credit amount being increased from $2.45 to $86.80. Column 506 depicts the total outstanding amount requested in ACH transfers but not yet received.

Columns 507 through 510 depict the revenues and costs that may be associated with issuing account provider computer system 104 performing the steps described herein. Issuing account provider computer system 104 (or any other entity or component described herein) may require merchants to pay a 1.7% interchange fee on each transaction, as depicted in column 507. For example, issuing account provider computer system 104 may receive data for a transaction of $100 with a certain merchant. But rather than pay the merchant $100, issuing account provider computer system 104 may collect a "fee" of 1.7% from the merchant by only transferring $98.30 to pay the merchant. There may also be three (or more or less) types of costs associated with issuing account provider computer system 104 performing the steps described herein. Column 508 reflects a 1.15% charge to issuing account provider computer system 104 whenever it makes a real-time signature request, column 509 reflects a 0.6% charge to issuing account provider computer system 104 whenever it makes a real-time PIN or PIN-less request, and column 510 reflects a $0.06 charge to issuing account provider computer system 104 whenever it makes a batch ACH transfer request. Any combination of charges may result depending on what requests were made (e.g., two real-time signature requests, five real-time PIN requests, three real-time PIN-less requests, and ten ACH transfer requests).

If real-time signature requests are made, the total revenue generated by issuing account provider computer system 104 over the four days shown on balance sheet 500 may be $4.83 ($7.46 interchange fees, minus $2.39 real-time signature costs, minus $0.24 batch ACH costs). This may result in an "effective" interchange rate of approximately 1.1%. If real-time PIN or PIN-less requests are made, the total revenue may be $6.42 ($7.46 interchange fees, minus $0.80 real-time PIN or PIN-less costs, minus $0.24 batch ACH costs). This may result in an "effective" interchange rate of 1.463%. There may therefore be cost advantages to requesting PIN or PIN-less debit transfers rather than signature debit transfers, for example. Also, it will be understood that the revenue generated from performing the steps described herein may be used in any way. For example, issuing account provider computer system 104 may provide a reward to account holder 101 for conducting transactions using the "linked" credit account, or may offer account holder 101 a certain percentage of revenues that are received.

FIG. 3 depicts an exemplary issuing account provider computer system 104 according to various embodiments of the disclosure. Issuing account provider computer system 104 may include one or more of the following modules: an identification module 301, a communication module 302, a determination module 303, a request module 304, and a transfer module 305. One or more of the modules may electronically communicate with each other and/or other entities via a communication mechanism 307, such as a data communication bus or one or more external networks as defined herein, including first network 107, second network 105, and/or third network 103. The modules may each be a computer program or an appropriately programmed computer, such as a mainframe or personal computer, or may include a plurality of such computers cooperating to perform the functionality described herein. The modules may also comprise or communicate with a storage mechanism 306, which may store account and other information, as described herein (e.g., account number of a credit account held at issuing account provider computer system 104, account number of a demand deposit account held at source account provider computer system 106, routing information for communicating with source account provider computer system 106 and/or merchant computer system 102, credit limit and available credit amount for the credit account, personal information for account holder 101).

As described herein, identification module 301 may identify two accounts held by an account holder, where one is used to fund transactions involving the other. Information associated with the accounts may be stored in storage mechanism 306. For example, a credit account and a demand deposit account may be identified. Communication module 302 may receive transaction data associated with a transaction initiated by the account holder with a merchant using the credit account, the transaction having a transaction amount. Determination module 303 may then determine whether the transaction amount exceeds an available credit amount for the credit account. If not, request module 304 may request via a first network a first type of transfer of the transaction amount from the demand deposit account, as described herein. If so, request module 304 may request via a different second network a different second type of transfer of the transaction amount from the demand deposit account, as described herein. Determination module 303 and request module 304 may also be the same module. Transfer module 305 may later transfer at least a portion of the transaction amount to pay the merchant, as described herein. Also, determination module 303 (or any other component of issuing account provider computer system 104) may reduce the available credit amount by the transaction amount after the transfer is requested, and/or increase the available credit amount by the transaction amount after the transfer is received, as described herein. Also, communication module 302 (or any other component of issuing account provider computer system 104) may receive the requested transfer, as described herein. Also, determination module 303 (or any other component of issuing account provider computer system 104) may increase the available credit amount in response to one or more actions of the account holder (e.g., opening another account, paying other bills on time), as described herein.

In various exemplary embodiments, the steps described herein may be performed by the modules of issuing account provider computer system 104. It will be recognized, however, that the steps may be performed, operated, managed, or controlled by any other type of entity, including a merchant, merchant processor, card association, host system, transaction aggregator, independent entity, or computer system, as well.

FIG. 4 depicts an exemplary source account provider computer system 106 according to various embodiments of the disclosure. Source account provider computer system 106 may include one or more of the following modules: an identification module 401, a communication module 402, and a transfer module 403. One or more of the modules may electronically communicate with each other and/or other entities via a communication mechanism 405, such as a data communication bus or one or more external networks as defined herein, including first network 107 and/or second network 105. The modules may each be a computer program or an appropriately programmed computer, such as a mainframe or personal computer, or may include a plurality of such computers cooperating to perform the functionality described herein. The modules may also comprise or communicate with a storage mechanism 404, which may store account and other information, as described herein (e.g., account number of a demand deposit account held at source account provider computer system 106, routing information for communicating with issuing account provider computer system 104, account balance for the demand deposit account, personal information for account holder 101).

As described herein, identification module 401 may identify, for example, a demand deposit account associated with account holder 101 held at source account provider computer system 106. Information associated with the account may be stored in storage mechanism 404. The demand deposit account may be used to fund transactions involving the credit account held at issuing account provider computer system 104. Communication module 402 may receive a request for a transfer of a transaction amount from the demand deposit account to the credit account, as described herein. The request may be for a first type of transfer if the transaction amount does not exceed the available credit amount, and the request may be for a second type of transfer if the transaction amount exceeds the available credit amount, as described herein. Transfer module 305 may later transfer the transaction amount from the demand deposit account according to the type of transfer requested (e.g., first type ACH transfer, second type real-time debit transfer).

Figure 6:
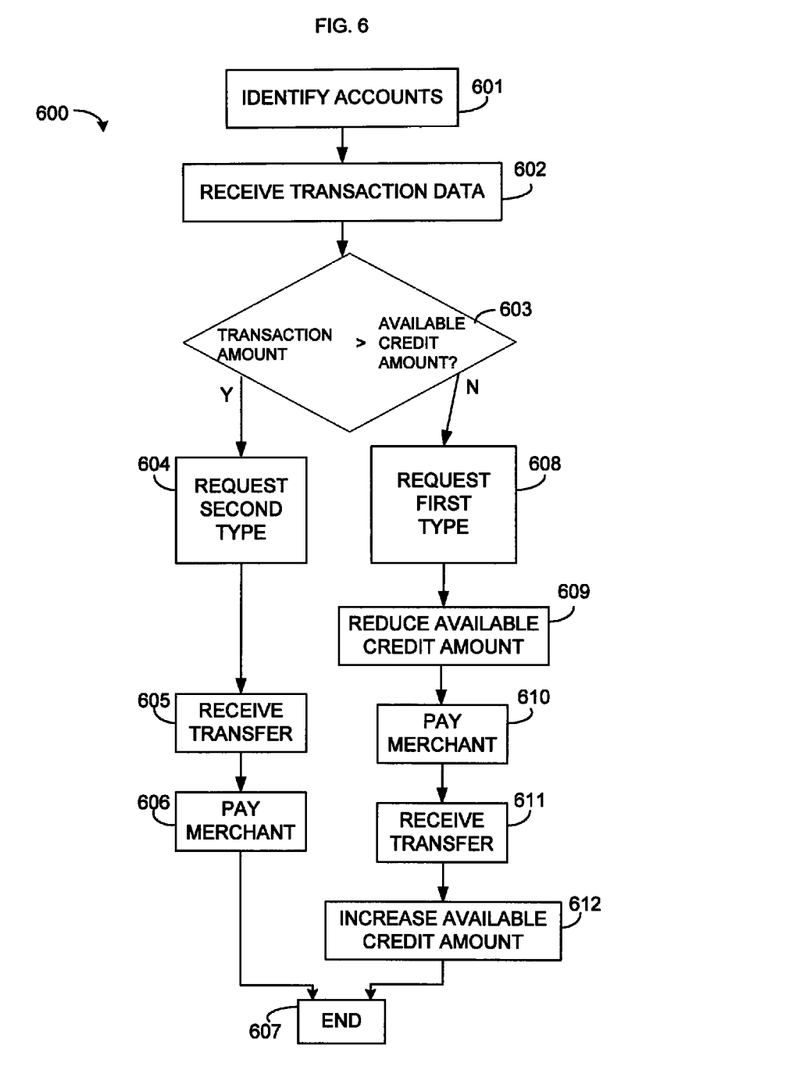
FIG. 6 depicts an exemplary flow chart which illustrates an exemplary method for processing a transaction according to various embodiments of the disclosure.

FIG. 6 depicts an exemplary flow chart 600 which illustrates an exemplary method for processing a transaction according to various embodiments of the disclosure. At block 601, a computer system such as, for example, issuing account provider computer system 104, may identify two accounts of an account holder where one account is used to fund transactions using the other account. For example, a demand deposit account held at source account provider computer system 106 may fund transactions using a credit account, which is held at issuing account provider computer system 104 and has an associated available credit amount (e.g., $200). The identification may take place, for example, when one or more of the accounts are established or each time transaction data is received, or identification may occur simply by virtue of account information for the accounts being stored in a storage mechanism (e.g., storage mechanism 306 of FIG. 3) for later use when transaction data is received.

At block 602, the computer system may receive transaction data for a transaction associated with the credit account. The transaction may have an associated transaction amount. At block 603, the computer system may determine whether the transaction amount exceeds the available credit amount. If not, the computer system may at block 608 request a first type of transfer of the transaction amount from the demand deposit account. In various exemplary embodiments, the first type of transfer may be an ACH transfer that takes more than one day (e.g., three days) to complete. The first type of transfer may be requested via an ACH network. At block 609, the computer system may reduce the available credit amount by the transaction amount. At block 610, the computer system may transfer at least a portion of the transaction amount to pay the merchant. At block 611, the computer system may receive the ACH transfer (e.g., three days after making the request) of the transaction amount. At block 612, the computer system may then increase the available credit amount by the transaction amount. The method then ends at block 607 and waits for the next transaction. If the transaction amount exceeds the available credit amount, the computer system may instead request a second type of transfer of the transaction amount from the demand deposit account. In various exemplary embodiments, the second type of transfer may be a debit transfer that takes less time (e.g., real-time, a few seconds, a few minutes, one day). The second type of transfer may be requested via a debit network. At block 605, the computer system may receive the transfer (e.g., in real-time) of the transaction amount. At block 606, the computer system may transfer at least a portion of the transaction amount to pay the merchant. The method then ends at block 607 and waits for the next transaction. It will be understood that the transfer to the merchant in blocks 606 and 610 may occur at any time in the method, or not at all.

Figure 7:
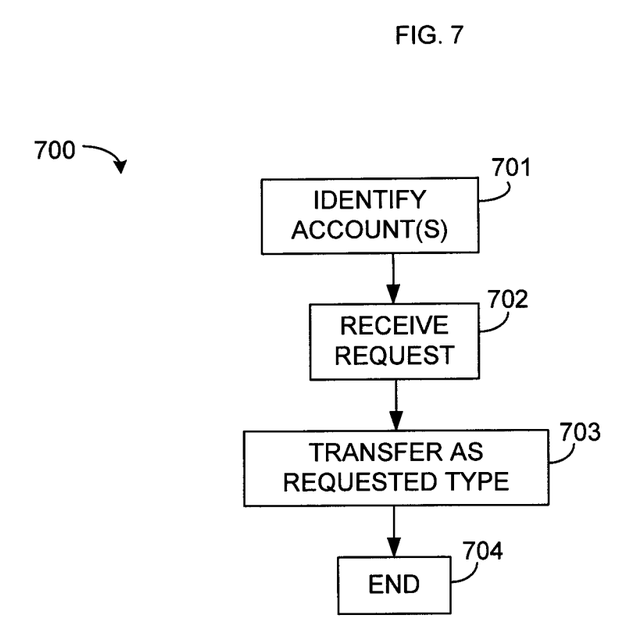
FIG. 7 depicts an exemplary flow chart which illustrates an exemplary method for processing a transaction according to various embodiments of the disclosure.

FIG. 7 depicts an exemplary flow chart 700 which illustrates an exemplary method for processing a transaction according to various embodiments of the disclosure. At block 701, a computer system such as, for example, source account provider computer system 106, may identify an account that is used to fund transactions using the other account. For example, a demand deposit account held at source account provider computer system 106 may fund transactions using a credit account, which is held at issuing account provider computer system 104 and has an associated available credit amount (e.g., $200). Source account provider computer system 106 may also identify the credit account held at issuing account provider computer system 104. The identification may take place, for example, when one or more of the accounts are established or each time a transfer request is received, or identification may occur simply by virtue of account information for the account(s) being stored in a storage mechanism (e.g., storage mechanism 404 of FIG. 4) for later use when a transfer request is received. At block 702, the computer system may receive a request for a transfer of a requested amount. The request may be for a first type of transfer or a second type of transfer, as described herein. At block 703, the computer system may transfer the requested amount according to the type of transfer requested. For example, if an ACH transfer request is received, the computer system may make an ACH transfer (e.g., three days later). Or, if a real-time debit request is received, the computer system may make a real-time transfer. The method then ends at block 704 and waits for the next request.

The systems and methods described herein may generate revenue for an issuing account provider through the collection of fees, such as interchange fees, while allowing account holders to conduct transactions using a "linked" account. The systems and methods described herein may also reduce credit risk associated with funding transactions using one account with transfers from another account. For example, one type of transfer that takes multiple days to complete may be made when there is sufficient "credit" available in the account holder's account, but another type of transfer that takes less time may be made when there is not sufficient "credit" available. In that way, an issuing account provider may manage credit risk and avoid the risk of losses being more than an available credit amount at any one time. The systems and methods described herein may also provide an advantage to account holders, who can avoid missing due dates for paying credit card bills because their credit accounts are directly funded by demand deposit accounts. Account holder rewards may also be funded from the interchange fees that the issuing account provider collects, providing an additional advantage to account holders. Any other component or entity depicted in FIGS. 1 through 4 may offer rewards to account holder 101 (or any other component or entity) as well.

The embodiments of the present invention are not to be limited in scope by the specific embodiments described herein. For example, an issuing account provider may be any entity with an associated computer system, including, for example, an account provider, bank, card issuer, merchant, or independent entity. Or, any other type of limit may be used instead of an available credit amount, such as a cap or limit on purchase transactions (e.g., $1000 per week, 10 transactions per day). Or, communication between the components described herein may be by any communication mechanism and information may be stored in any type of electronic storage mechanism. Or, user interfaces for interacting with the various components described herein may be in any format. Or, the system for processing a transaction may be a collection of more than one computer, each operating collectively as the system. Or, the system may be completely automated such that processing a transaction does not require interaction with an operator or a user.

Thus, such modifications are intended to fall within the scope of the following appended claims. Further, although some of the embodiments of the present invention have been described herein in the context of a particular implementation in a particular environment for a particular purpose, those of ordinary skill in the art should recognize that its usefulness is not limited thereto and that the embodiments of the present invention can be beneficially implemented in any number of environments for any number of purposes. Accordingly, the claims set forth below should be construed in view of the full breadth and spirit of the embodiments of the present invention as disclosed herein. While the foregoing description includes many details and specificities, it is to be understood that these have been included for purposes of explanation only, and are not to be interpreted as limitations of the invention. Many modifications to the embodiments described above can be made without departing from the spirit and scope of the invention.

The invention claimed is:

1. A system for processing a transaction, the system comprising:
   one or more computer processors that identify a credit account held by an account holder and a demand deposit account held by the account holder, the credit account having an available credit amount;
   one or more computer processors that receive transaction data associated with a transaction initiated by the account holder with a merchant using the credit account, the transaction having a transaction amount;
   one or more computer processors that determine whether the transaction amount exceeds a transaction threshold amount;
   one or more computer processors that request via a network a transfer of the transaction amount from the demand deposit account, wherein:
      the transfer is a first type of transfer and the network is a first network if the transaction amount does not exceed the transaction threshold amount, and
      the transfer is a second type of transfer and the network is a second network if the transaction amount exceeds the transaction threshold amount, the second type of transfer different from the first type of transfer, the second network different from the first network; and
   transfer at least a portion of the transaction amount to pay the merchant.

2. The system of claim 1, wherein the first type of transfer is an automated clearing house transfer and the first network is an automated clearing house network.

3. The system of claim 2, wherein the automated clearing house transfer is requested on a predetermined day or time.

4. The system of claim 2, wherein the automated clearing house transfer is received on a predetermined day or time.

5. The system of claim 2, the one or more computer processors further collectively programmed to:
   reduce the available credit amount by the transaction amount after the transaction data is received; and
   increase the available credit amount by the transaction amount after the automated clearing house transfer is received.

6. The system of claim 1, wherein the second type of transfer is a real-time debit transfer and the second network a debit network.

7. The system of claim 6, wherein requesting the real-time debit transfer comprises providing a personal identification number associated with the demand deposit account.

8. The system of claim 1, wherein the demand deposit account is a checking account, savings account, or money market account.

9. The system of claim 1, wherein the account holder uses a transaction card to initiate the transaction, the transaction card associated with the credit account and the demand deposit account.

10. The system of claim 1, wherein a credit card interchange rate is imposed on the transaction, the credit card interchange rate being a percentage of the transaction amount.

11. The system of claim 1, the one or more computer processors further collectively programmed to:
increase the available credit amount in response to one or more actions of the account holder.

12. A method for processing a transaction comprising:
identifying a credit account held by an account holder and a demand deposit account held by the account holder, the credit account having an available credit amount;
receiving transaction data associated with a transaction initiated by the account holder with a merchant using the credit account, the transaction having a transaction amount;
determining whether the transaction amount exceeds a transaction threshold amount;
using one more computer processors, requesting via a network a transfer of the transaction amount from the demand deposit account, wherein:
the transfer is a first type of transfer and the network is a first network if the transaction amount does not exceed the transaction threshold amount, and
the transfer is a second type of transfer and the network is a second network if the transaction amount exceeds the transaction threshold amount, the second type of transfer different from the first type of transfer, the second network different from the first network; and
transferring at least a portion of the transaction amount to pay the merchant.

13. The method of claim 12, wherein the first type of transfer is an automated clearing house transfer and the first network is an automated clearing house network.

14. The method of claim 13, wherein the automated clearing house transfer is requested on a predetermined day or time.

15. The method of claim 13, wherein the automated clearing house transfer is received on a predetermined day or time.

16. The method of claim 13, further comprising:
reducing the available credit amount by the transaction amount after the transaction data is received; and
increasing the available credit amount by the transaction amount after the automated clearing house transfer is received.

17. The method of claim 12, wherein the second type of transfer is a real-time debit transfer and the second network a debit network.

18. The method of claim 17, wherein requesting the real-time debit transfer comprises providing a personal identification number associated with the demand deposit account.

19. The method of claim 12, wherein the demand deposit account is a checking account, savings account, or money market account.

20. The method of claim 12, wherein the account holder uses a transaction card to initiate the transaction, the transaction card associated with the credit account and the demand deposit account.

21. The method of claim 12, wherein a credit card interchange rate is imposed on the transaction, the credit card interchange rate being a percentage of the transaction amount.

22. The method of claim 12, further comprising:
increasing the available credit amount in response to one or more actions of the account holder.

23. A non-transitory computer-accessible medium encoded with computer program code effective to perform the following:
identify a credit account held by an account holder and a demand deposit account held by the account holder, the credit account having an available credit amount;
receive transaction data associated with a transaction initiated by the account holder with a merchant using the credit account, the transaction having a transaction amount;
determine whether the transaction amount exceeds a transaction threshold amount;
request via a network a transfer of the transaction amount from the demand deposit account, wherein:
the transfer is a first type of transfer and the network is a first network if the transaction amount does not exceed the transaction threshold amount, and
the transfer is a second type of transfer and the network is a second network if the transaction amount exceeds the transaction threshold amount, the second type of transfer different from the first type of transfer, the second network different from the first network; and
transfer at least a portion of the transaction amount to pay the merchant.

24. A system for processing a transaction, the system comprising:
one or more computer processors that identify a demand deposit account held by an account holder;
one or more computer processors that receive via a network a request for a transfer of a transaction amount from the demand deposit account to a credit account held by the account holder, the transaction amount for a transaction initiated by the account holder with a merchant using the credit account, wherein:
the transfer is a first type of transfer and the network is a first network if the transaction amount does not exceed a transaction threshold amount associated with the credit account, and
the transfer is a second type of transfer and the network is a second network if the transaction amount exceeds the transaction threshold amount, the second type of transfer different from the first type of transfer, the second network different from the first network; and
transfer the transaction amount from the demand deposit account according to the type of transfer requested.

25. A method for processing a transaction comprising:
identifying a demand deposit account held by an account holder;
using one or more computer processors, receiving via a network a request for a transfer of a transaction amount from the demand deposit account to a credit account held by the account holder, the transaction amount for a transaction initiated by the account holder with a merchant using the credit account, wherein:
the transfer is a first type of transfer and the network is a first network if the transaction amount does not exceed a transaction threshold amount associated with the credit account, and
the transfer is a second type of transfer and the network is a second network if the transaction amount exceeds the transaction threshold amount, the second type of transfer different from the first type of transfer, the second network different from the first network; and
transferring the transaction amount from the demand deposit account according to the type of transfer requested.

26. A non-transitory computer-accessible medium encoded with computer program code effective to perform the following:
- identify a demand deposit account held by an account holder;
- receive via a network a request for a transfer of a transaction amount from the demand deposit account to a credit account held by the account holder, the transaction amount for a transaction initiated by the account holder with a merchant using the credit account, wherein:
  - the transfer is a first type of transfer and the network is a first network if the transaction amount does not exceed a transaction threshold amount associated with the credit account, and
  - the transfer is a second type of transfer and the network is a second network if the transaction amount exceeds the transaction threshold amount, the second type of transfer different from the first type of transfer, the second network different from the first network; and
- transfer the transaction amount from the demand deposit account according to the type of transfer requested.

* * * * *

UNITED STATES PATENT AND TRADEMARK OFFICE
CERTIFICATE OF CORRECTION

| | | |
|---|---|---|
| PATENT NO. | : 8,423,453 B1 | Page 1 of 1 |
| APPLICATION NO. | : 12/574950 | |
| DATED | : April 16, 2013 | |
| INVENTOR(S) | : Elliott | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 554 days.

Signed and Sealed this
Ninth Day of December, 2014

Michelle K. Lee
*Deputy Director of the United States Patent and Trademark Office*